United States Patent [19]

Quast et al.

[11] Patent Number: 4,641,799
[45] Date of Patent: Feb. 10, 1987

[54] ARRANGEMENT FOR CONTROLLING THE AIR FLOW OVER AERODYNAMIC PROFILES

[75] Inventors: Armin W. Quast; Karl H. Horstmann, both of Brunswick, Fed. Rep. of Germany

[73] Assignee: Deutsche Forschungs- und Versuchsanstalt für Luft- und Raumfahrt e.V., Cologne, Fed. Rep. of Germany

[21] Appl. No.: 768,166

[22] Filed: Aug. 21, 1985

Related U.S. Application Data

[63] Continuation of Ser. No. 582,142, Feb. 24, 1984, abandoned, which is a continuation of Ser. No. 318,697, Nov. 6, 1981, abandoned.

[30] Foreign Application Priority Data

Nov. 15, 1980 [DE] Fed. Rep. of Germany ....... 3043567

[51] Int. Cl.$^4$ ............................................. B64C 21/02
[52] U.S. Cl. ...................................... 244/207; 416/91
[58] Field of Search ...................... 244/207, 209, 130; 416/97 A, 90 R, 90 A, 91

[56] References Cited

U.S. PATENT DOCUMENTS

| 2,833,492 | 5/1958 | Fowler | 244/209 |
| 3,194,518 | 7/1965 | Walsh | 244/207 |
| 3,262,658 | 7/1966 | Reilly | 244/207 |
| 3,421,577 | 1/1969 | Valyi | 244/208 |
| 4,033,526 | 7/1977 | Benson | 244/15 |

FOREIGN PATENT DOCUMENTS

| 358128 | 2/1929 | Belgium . |
| 270466 | 12/1950 | Switzerland . |
| 271827 | 4/1951 | Switzerland . |
| 519623 | 4/1940 | United Kingdom . |
| 660558 | 11/1951 | United Kingdom . |
| 808493 | 2/1959 | United Kingdom . |
| 1465412 | 2/1977 | United Kingdom . |

OTHER PUBLICATIONS

"Flight Experiments on Suction for High Lift", by M. R. Head et al., Journal of Aircraft, vol. 4, Mar./Apr. 1967, pp. 81–89.
"Low-Speed Flows Involving Bubble Separations", by Itiro Tani, Progress in Aeronautical Sciences, vol. 5, 1964, pp. 70–81.

Primary Examiner—Galen Barefoot
Attorney, Agent, or Firm—Gottlieb, Rackman & Reisman

[57] ABSTRACT

An arrangement for controlling the air flow past an aerodynamic profile, (such as an aerofoil surface of a wing, tail plane, or fuselage of an aircraft or missile, a propeller, helicopter rotor, or blading of a turbo-engine fan or wind impeller) by providing a number of orifices of small diameter spaced apart in the profile surface in the longitudinal direction of the profile transversely to the direction of air flow over the profile and to the chordwise direction of the profile. Fluid is either discharged or drawn in through the orifices perpendicularly to the air flow in the region of separation of laminar flow. The orifices have a coefficient of flow (i.e., either a discharge or an intake coefficient) $C_Q=(V/FV)$ of up to $10^{-4}$ for a Reynolds Number less than $3 \times 10^6$, where $v=$volume flow of the fluid through the discharge orifices, $F=$profile area and $V=$velocity of the air stream flowing over the wing or blade. The invention is particularly concerned with controlling the air flow over an aerofoil profile of a wing of a slowly flying aircraft, such as a glider or light aircraft.

7 Claims, 2 Drawing Figures

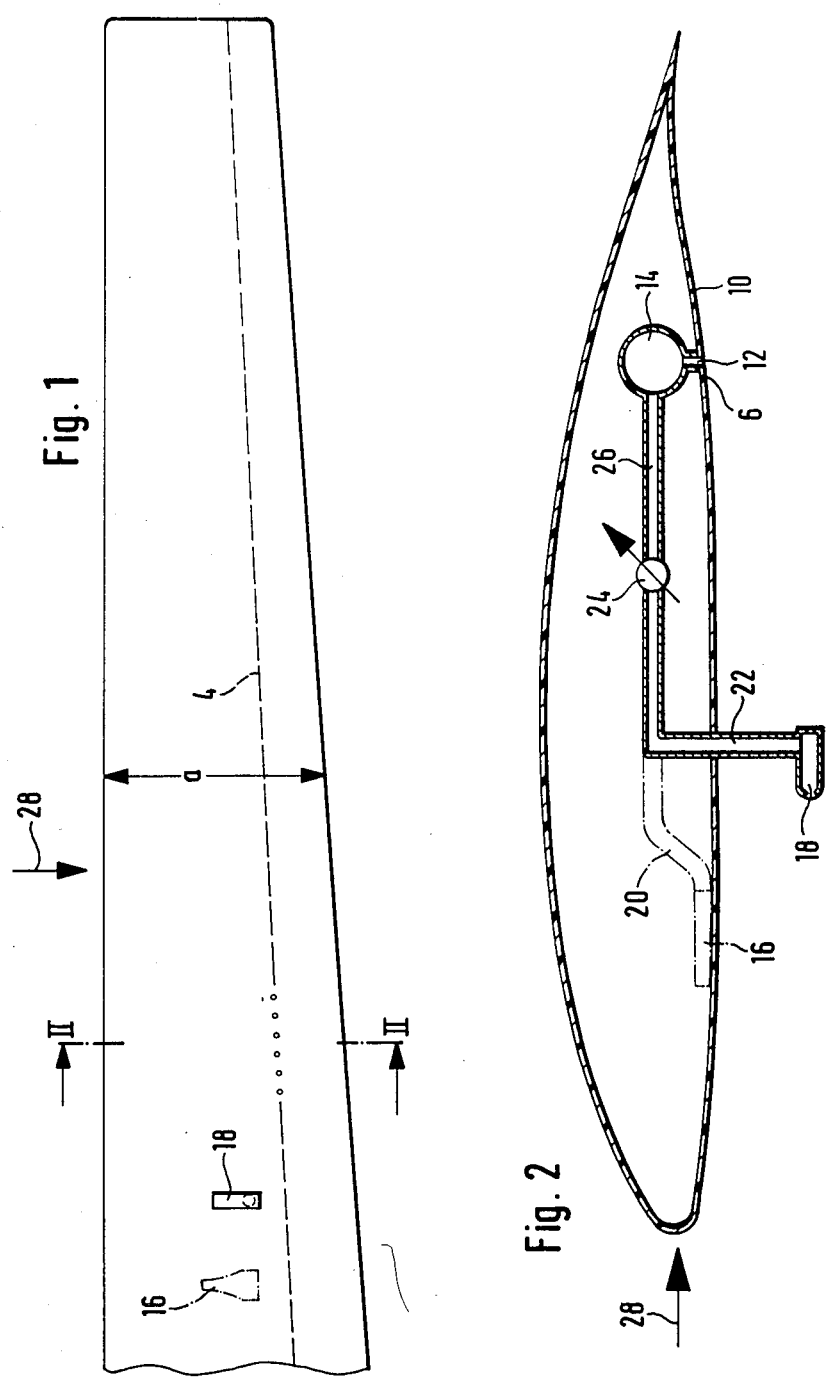

ARRANGEMENT FOR CONTROLLING THE AIR FLOW OVER AERODYNAMIC PROFILES

This application is a continuation of application Ser. No. 582,142, filed 2/24/84 now abandoned, which is a continuation of Ser. No. 318,697, filed 11/06/81, now abandoned.

BACKGROUND OF THE INVENTION

The invention relates to an arrangement for controlling the air flow over aerodynamic profiles. Such arrangements for controlling the air flow past aerodynamic profiles by the discharge of fluids through orifices which are spaced apart along the length of the profile transversely to the air flow past the profile for the avoidance of boundary layer separation are known. In the known arrangements the orifices are slots extending substantially over the whole length of the profile and through which the fluids are exhausted. The discharge is effected with great energy. Thus it is attempted to increase the velocity of the air-flow in the layer near to the skin by an input of energy, and thereby to eliminate the risk of separation. (Aerodynamik des Flugzeuges-(Aerodynamics of Aircraft) by Schichtling and Truckenbrodt, Vol. 1, pp. 260–263, Springer Verlag, 1959).

DESCRIPTION OF THE PRIOR ART

It is known that laminar flow over solid bodies having aerodynamic profiles and in wind tunnels may form laminar separation bubbles. The drag of aerodynamic profiles is considerably increased by these laminar separation bubbles. It is known that laminar separation bubbles can be avoided through use of mechanical turbulators, such as trip wires, projecting edges, steps, sheet-metal angles, obstacles disposed with geometrical regularity, and the like. Mechanical turbulators however bring about additional drags or losses, and they still cause losses when, in other operating conditions, they are for physical reasons not needed, for example when owing to a transition to higher Reynold Numbers laminar separation bubbles no longer arise during operation.

It is possible to avoid laminar separation bubbles with profiles, for low Reynolds Numbers, by suitable shaping (pressure distribution along the skin). Such a shaping (pressure distribution) is however only effective for the specified design point. Outside this design point, increased losses are incurred. Moreover the avoidance of laminar separation bubbles by suitable shaping of the profile is difficult to compute and is especially sensitive to inaccuracies in fabrication.

The object of this invention is to provide an arrangement whereby it is possible to prevent laminar separation bubbles, or to reduce them in a manner that decreases the drag, without the disadvantages of the known arrangements.

SUMMARY OF THE INVENTION

According to the invention, this problem is solved in that, with profiles for Reynolds Numbers $<3\times10^6$, a plurality of discharge and/or intake orifices of small diameter are disposed in the region of the separation point of the laminar flow, and these have a coefficient of flow (i.e. either discharge or intake coefficient) $C_Q=Y/(FV)$ up to $10^{-4}$.

The direction of flow through the orifices is preferably perpendicular to the profile surface. A ram-pressure system may be provided for the delivery and compression of the fluid to be discharged through the orifices. Each discharge orifice may have a diameter less than 1 mm and preferably between 0.6 and 0.8 mm. The discharge velocity of the fluid is preferably of the order of 10 m/sec.

Other features of the arrangement provided by this invention will be described in the description of the preferred embodiment which follows.

BRIEF DESCRIPTION OF THE DRAWINGS

An embodiment of the invention is illustrated in the drawings by way of example, and is described as follows in detail with the aid of the drawings.

FIG. 1 is a schematic view of the underside of a glider wing.

FIG. 2 is a section along the line II—II in FIG. 1.

DESCRIPTION OF THE PREFERRED EMBODIMENT

The wing of aerofoil shape of a glider is shown in FIG. 1 as a plan view of its underside and is designed for a moderate Reynolds Number of $2.5\times10^6$. The air flows past it in the direction of the arrow 28. The mean profile chord a of the wing is 75 cm. On the underside of the wing having this profile the laminar separation and therewith the development of a laminar separation bubble begins at 74% of the profile chord. At a corresponding distance from the leading edge of the aerofoil profile there is a plurality of discharge holes 12 spaced apart along the length of the wing. These holes 12 are shown only schematically in FIG. 1 and they lie along a line 4 which is shown as a series of dashes in FIG. 1.

In the profile cross-section shown in FIG. 2, the laminar separation bubble is located between the lines 6 and 10. In this region, or in front of it, lies the line 4 in FIG. 1 along which there is a plurality of discharge holes 12, which are realized as drillings perpendicular to the profile surface. As shown in FIG. 2 an air distribution channel 14 is provided which extends in the direction of the length of the aerofoil wing and into which air is fed under pressure. The air then emerges substantially perpendicularly to the profile surface, through the outlet holes 12.

It is possible to provide several rows of discharge drillings, at a distance apart from each other in the direction of the chord of the profile and connected according to the prevailing Reynolds Number.

For supplying the air, ram-pressure arrangements are provided, e.g, in the shape of external pressurizing pipes 18. However ram-pressure inlets, e.g., so-called NACA inlets 16, integrated into the profile or the aircraft, may alternatively be provided. The air channel 14 is supplied with ram air via the ram-pressure inlets 16 or 18. In FIG. 2 these are represented schematically by the ducts 20 and 22 which are provided alternately and are for example connected via a control device 24 to the air channel 14 via the duct 26. Several of the ram-pressure generating inlets can be provided over the length of the aerofoil profile, i.e., in this example over the length of the wing. These inlets can then conduct air into a full-length air channel, or into air-channel sections separated from one another. The whole of the wing interior, or a part of it, can be used as an air channel.

The arrangement is to be designed so that a blow-out coefficient $C_Q=v/(FV)=\leq 10^{31\ 4}$ is adhered to, where $v=$volume flow of the air out of the discharge orifices, F=wing area and V=air flow velocity over the profile surface.

Typical discharge orifices are holes of 0.6 mm diameter spaced 15 mm apart, with a discharge velocity of approximately 10 m/sec.

In a glider that was constructed, a reduction of the drag was achieved at a Reynolds Number of $1.5 \times 10^6$ and thereby a gain of 20%. This gain decreases as the Reynolds Number rises. With an external ram-pipe there is a loss of 1% of the gain. Thus no additional power needs to be employed for the air-blast. The system recoups its power through the drag reduction that is achieved.

By regulating the amount of air supplied, via the ram-pressure arrangements, by means of the control device 24, the action of the air discharge can be adjusted over a specified range of Reynolds Numbers or angles of incidence. In many cases it is sufficient to provide means of adjustment by which the action of the air discharge can be shut off. It is also possible to keep the latter activated under all operating conditions.

An analogous arrangement can also be provided solely or additionally for the upper side of the aerofoil profile. Arrangements in accordance with the invention may also be considered intentionally during the design of the profile. Thus a pressure distribution may be chosen for the aerofoil profile, such that the position of the flow envelope, and therefore the development of a laminar separation bubble, occurs in a definite region independently of fabrication inaccuracies. Such a design of the profile would (in the absence of additional means) then lead to an enlargement of the separation bubble and therefore to an increased drag. Through the arrangement provided by the invention, the effect of such an enlarged separation bubble is eliminated. Thereby fabrication inaccuracies do not lead to additional drag for a profile designed in that way. The construction is here effected in such a way that a distinct pressure minimum is placed very far to the rear. Thereby a laminar boundary layer is obtained which is still adequately stable even with fabrication inaccuracies. In a similar manner it can be prevented that the laminar flow becomes turbulent because of roughness, whereby the drag is increased. Roughness is understood here to mean contamination by dust, ice deposition, impacted insects, rain and the like.

In the foregoing account, the invention is described on the basis of an aerofoil wing for a glider. However the invention is nevertheless applicable to other aerodynamic bodies, such as tail planes and fuselages of aircraft and missiles, propellers and helicopter rotors, as well as the blading of turbo-engines, fans and wind impellers.

Further instead of an air discharge through the orifices 12 an air intake through similar orifices can be provided in the region of the laminar separation bubble.

The reduced pressure needed for this may for example be produced by Venturi tubes, or else be derived from reduced-pressure regions of the aerofoil profile.

What I claim as my invention and desire to secure by Letters Patent of the United States is:

1. In a wing or blade having an aerodynamic profile and designed for use under laminar air flow conditions at a Reynolds number lower than $3 \times 10^6$, the wing or blade having a profile surface which at a limited region between the leading and trailing edges of the wing or blade normally gives rise to a separation bubble disrupting the laminar air flow over that profile surface;

an arrangement for preventing the formation of the separation bubble, comprising:

at least one row of fluid discharge orifices arranged only in said limited region of the profile surface, the orifices in said at least one row being spaced from one another substantially along the longitudinal direction of the wing or blade;

said discharge orifices having a diameter of less than 1 mm and a discharge coefficient $C_Q = v/(FV)$ of less than $10^{-4}$ where v is the volume flow of air or like fluid through the discharge orifices, F is the area of the surface of the wing or blade, and V is the velocity of the air flow over the wing or blade; and means in said wing or blade for directing air or like fluid to said discharge orifices from the interior of the wing or blade under a pressure sufficient to cause an outflow of the air or fluid through said discharge orifices at a velocity and volume flow rate sufficient to cause increased turbulence in the air flow over the wing or blade in said limited region of the profile surface for avoiding the formation of the separation bubble.

2. An arrangement as claimed in claim 1 in which the discharge direction of the discharge orifices is substantially perpendicular to the profile surface.

3. An arrangement as claimed in claim 1 in which a ram-pressure system is provided for the delivery and compression of the air or fluid to be discharged.

4. An arrangement as claimed in claim 1 in which each discharge orifice has a diameter of between 0.6 and 0.8 mm.

5. An arrangement as claimed in claim 1 in which the discharge velocity through the discharge orifices is of the order of 10 m/sec.

6. An arrangement as claimed in claim 1 in which the aerodynamic profile is a wing profile of an aircraft designed for slow flying, such as a glider or light aircraft.

7. An arrangement as claimed in claim 1 in which means are provided to control the air supply to the discharge orifices.

* * * * *